G. W. BROWN.
Corn-Planter.
No. 1,092. Reissued Dec. 11, 1860.
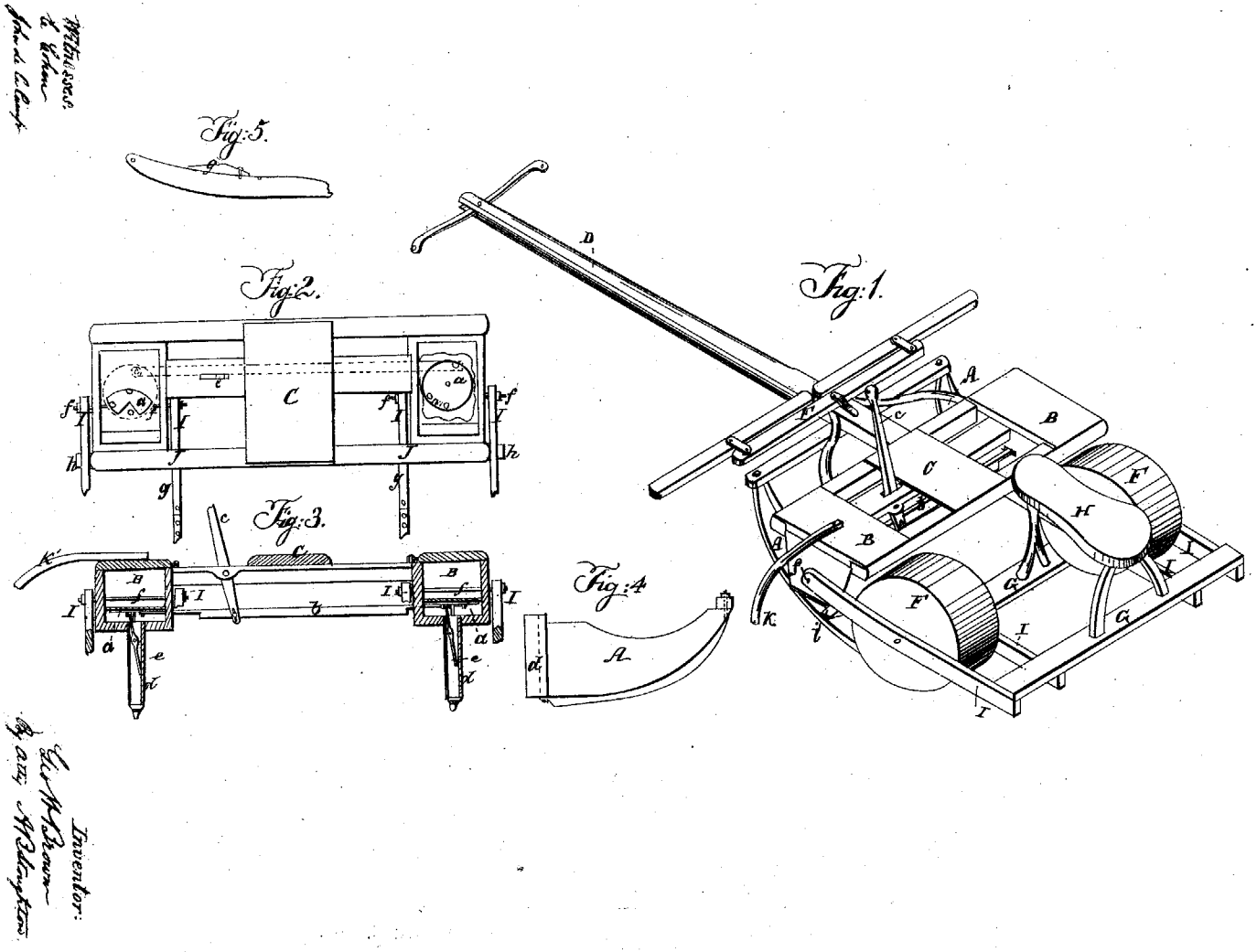
Witnesses.
L. Cohen
John de C. Campe
Inventor:
Geo W Brown
By atty A P Stoughton
N. PETERS, PHOTO-LITHOGRAPHER, WASHINGTON, D. C.

UNITED STATES PATENT OFFICE.

GEO. W. BROWN, OF GALESBURG, ILLINOIS.

IMPROVEMENT IN SEED-PLANTERS.

Specification forming part of Letters Patent No. 12,811, dated May 8, 1855; Reissue No. 503, dated November 10, 1857; Reissue No. 1,092, dated December 11, 1860.

DIVISION B.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the construction and operation of the same, reference being had to the accompanying drawings, making a part of this specification, in which—

Figure 1 represents a perspective view of the machine complete. Fig. 2 represents a top plan of the seed hoppers and valves and the frame-work supporting them. Fig. 3 represents a vertical section taken transversely through the seed hoppers, valves, and runners or shoes, and showing the device for operating the valves, also representing parts of the frame-work for supporting them, as well as the marker. Fig. 4 represents a side elevation of one of the runners. Fig. 5 represents the lock or block for defining or adjusting the descent of the rear part of the frame.

Similar letters of reference, where they occur in the several figures, denote corresponding parts of the machine in all the drawings.

To give the operator or conductor of a seed-planting machine full control of the machine while he rides upon it involves the necessity of a peculiar arrangement of seat in relation to the axle, or the driving, supporting, or covering wheels in which the axle is supported, so that the seat may be used as a lever, the occupant of it simply shifting his person or his weight, and thus, making a fulcrum of the axle or the wheels that support it, may raise or lower the seeding apparatus or force it into the ground, as may be required. This is the object of this part of my invention; and my invention consists, in connection with a seed-planting machine that has its seeding devices forward of the driver's position and forward of the axle, in the locating of the seat in such relation to the axle of the supporting-wheels as that the occupant of said seat may, by moving himself or throwing his weight forward or backward on the seat, and without leaving it, force the seeding apparatus into or raise or lower it from the ground, as he may desire, or as the nature of the work may require.

To enable others skilled in the art to make and use my invention, I will proceed to describe the same with reference to the drawings.

A A represent a pair of runners or shoes upon which the seed-hoppers B B are mounted, and which, together with other cross-pieces extending from shoe to shoe, form a frame to which the tongue D is united.

F F are a pair of wheels supported by journals or axles in the frame-pieces I I, &c., that are all united to a cross-piece, G, at the rear, and another cross-piece G, which is in, at, or near the line of the bearings or journals of the wheels F. These pieces form also a second frame, which is pivoted to the front frame at the points *f f*. The outer pieces I I pass over respectively a lock, block, or stop, *h*, on the front frame, and are so arranged as to prevent the rear of the frame from descending so low as to strike the ground or incommode the driver or occupant of the seat.

*g g* are adjustable purchase-blocks on the inside levers I I, as seen at Fig. 5, which take under the cross-bar J of the front frame, and define or adjust the extent to which said front frame may be raised or lowered. The pieces I I serve as levers by which the occupant of the seat H, by his weight or his position, or both, can raise up or let or force down the seeding apparatus, shoes, or seed-ducts, as may be required for running the machine around, or for deeper or less deep planting. The seat H is secured to the frame-pieces G G, and it extends back of the line of the axles of the wheels or centers of the wheels, so that the occupant of the seat may use it as a lever to raise up the front frame-work and seeding devices, as above mentioned, by shifting his weight or moving his person thereon. Should the axle extend clear across from wheel to wheel, it would then occupy the place of the front cross-piece G, and the axle could then become the support of the seat H.

The seeding apparatus herein represented operates as follows: The shoes A form a gash or furrow in the ground, and the seed-ducts are close in rear of them. The valves *a a* are united by a cross-bar, *b*, to which a lever, *c*, is attached, said lever being in convenient position for the operator to grasp and move from his seat on the machine. Instead of the grains dropping directly from the seed slides or valves

*a a* in the hopper into the gash or furrow, or at one fall, there may be a second set of valves, *e e*, Fig. 3, extending down into the seed-ducts *d d*, which catch the grains that drop from the hoppers and allow those just previously dropped and caught by them to fall into the furrows, the object of this being to let the seed have as little space to drop from as possible, because while they are falling the machine is moving along over the field, and without the lower valves would dribble the grains along, instead of leave them in straight rows or hills, so as to be easily cultivated afterward.

K is an indicator or marker which directs the operator in moving the lever *c*. As soon as the marker points over the previously-planted hill or furrow the lever is moved, which drops the charge of seeds in exact line with the others previously dropped, and thus perfect uniformity and directness of rows or hills are preserved.

Having thus fully described the nature of this part of my invention, what I claim under this patent is—

In combination with a seed-planting machine operated by hand, and having its seeding devices forward of the center of the wheels and forward of the driver's seat, and a hinged connection, the locating of the seat in such relation to a line drawn through the centers of the wheels or ground-supports as that the occupant of said seat may, by moving himself or throwing his weight forward or backward on his seat without the necessity of rising, walking, or standing over or near the seeding devices, force the seeding apparatus into or raise it from the ground, substantially as described.

GEO. W. BROWN.

Witnesses:
A. B. STOUGHTON,
E. COHEN.